(12) United States Patent
Neugebauer

(10) Patent No.: US 11,477,865 B2
(45) Date of Patent: Oct. 18, 2022

(54) MULTICHANNEL LIGHTING CONTROL

(71) Applicant: BIG DUTCHMAN INTERNATIONAL GMBH, Vechta (DE)

(72) Inventor: Nils Neugebauer, Wardenburg (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 0 days.

(21) Appl. No.: 17/370,122

(22) Filed: Jul. 8, 2021

(65) Prior Publication Data

US 2022/0015204 A1    Jan. 13, 2022

(30) Foreign Application Priority Data

Jul. 10, 2020  (LU) ........................................ 101921

(51) Int. Cl.
| | |
|---|---|
| *H05B 45/20* | (2020.01) |
| *H05B 45/325* | (2020.01) |
| *A01K 31/00* | (2006.01) |

(52) U.S. Cl.
CPC ............. *H05B 45/20* (2020.01); *A01K 31/00* (2013.01); *H05B 45/325* (2020.01)

(58) Field of Classification Search
CPC ...... H05B 45/20; H05B 45/32; H05B 45/325; H05B 47/10; A01K 31/00
See application file for complete search history.

(56) References Cited

U.S. PATENT DOCUMENTS

| 7,956,824 B2 * | 6/2011 | Li Volsi ................. H05B 45/20 |
| | | 345/82 |
| 2013/0241433 A1 | 9/2013 | Ge et al. |

FOREIGN PATENT DOCUMENTS

| DE | 102018115672 | 1/2020 | |
| EP | 1555859 | 7/2005 | |
| EP | 2036406 | 3/2009 | |
| EP | 2854483 A1 * | 4/2015 | ............ H05B 45/32 |
| WO | 2008007268 | 1/2008 | |
| WO | 2015105776 | 7/2015 | |

* cited by examiner

*Primary Examiner* — Jimmy T Vu
(74) *Attorney, Agent, or Firm* — Price Heneveld LLP

(57) ABSTRACT

An illumination device for illuminating an animal housing device, having a plurality of light sources, with a first light source and a second light source, wherein the first light source and the second light source are designed to emit light with wavelengths or colors differing from one another such as red and white, and a luminaire that includes a logic module. The logic module is designed to read out a frequency of a signal of an electrical energy, to compare the frequency of the signal with data stored in the logic module, and in dependence upon the comparison between the frequency of the signal and the data stored in the logic module to determine one or more channels encoded in the frequency. Furthermore, the invention relates to a control device, a method for controlling a lighting device, and a use of a illumination device.

20 Claims, 9 Drawing Sheets

MULTICHANNEL LIGHTING CONTROL

CROSS-REFERENCE TO FOREIGN PRIORITY APPLICATION

The present application claims the benefit under 35 U.S.C. §§ 119(b), 119(e), 120, and/or 365(c) of LU 101921 filed Jul. 10, 2020.

FIELD OF THE INVENTION

The invention relates to a lighting device, in particular for lighting an animal housing device, preferably for poultry animals such as laying hens. Furthermore, the invention relates to a control device for controlling a lighting device, a method for controlling a lighting device, and a use of a lighting device.

BACKGROUND OF THE INVENTION

The lighting of an animal housing device, such as a housing building for laying hens, is typically done by means of lighting devices with a plurality of light sources and, nowadays, light-emitting diodes (LEDs) are often used as light sources in order to keep the power consumption of the lighting device low.

In principle, it is possible to use several light-emitting diodes that emit light with different wavelengths and thus different colors. By means of such differently colored light sources, different lighting moods can then be created by mixing the colors, which can have a positive effect on desired and undesired animal behaviors as well as on general animal welfare. For example, red and white light sources or several light sources of different colors can be used as part of one lighting device or several lighting devices in a barn. In order to be able to generate the desired light with the different colored light sources, it is necessary to control these light sources accordingly.

EP1555859B1 describes a method for controlling illuminant operating devices. High-frequency digital control signals are modulated onto a supply voltage, which are demodulated by demodulators in the illuminant operating devices in order to then control the associated illuminants. One disadvantage of such a method is that such demodulators require a lot of space. Another disadvantage is that the demodulators incur high costs. In particular, this technology is, therefore, not suitable for lighting devices with a large number of light sources for which a large number of demodulators are required, as is the case in applications in large stable buildings.

EP2036406B1 describes a lighting system wherein a controller generates a plurality of switching frequency signals in the range of 57 kHz to 127 kHz which are received by bandpass filters having bandpass characteristics. The bandpass filters then each provide an output signal to a lamp driver and, in response to this output signal, an operating state is set by the respective lamp driver. A disadvantage of such a system is that in the case of unshielded lines, the high-frequency switching frequency signals can cause undesired radiation of electromagnetic waves. Another disadvantage is that such switching frequency signals smear with increasing line length and then bandpass filters can no longer filter them. This technology is, therefore, not suitable for lighting devices in large stable buildings with the associated long line lengths.

WO2015105776A1 describes a light emitting diode lighting arrangement that receives an electrical excitation signal that is varied by a dimming device. A driver circuit has first and second paths, each having a plurality of light emitting diodes. Each plurality of light emitting diodes has a threshold voltage. When the threshold voltage is exceeded, the respective light emitting diodes emit light. A disadvantage of such an illumination arrangement is that a voltage drop occurs across the respective light emitting diodes. The total voltage drop can cause some light emitting diodes to fall below the threshold value, even though the emitted voltage is above the threshold value.

A fundamental problem that arises with known lighting devices is due to the fact that such lighting devices require a high material input and thus high material costs. On the one hand, additional costs are necessary for the logical control elements. On the other hand, costs are incurred for the connecting lines. Another problem is due to the fact that the lighting devices have a considerable complexity, which means that a high expenditure of time is necessary for the installation of known lighting devices. These costs and the associated installation effort are particularly disadvantageous in stable buildings with long cable runs and a large amount of light required.

US2013/241433A1 and WO2008/007268A2 describe lighting devices in which a control signal is modulated onto a supply line and this control signal is decoded in the luminaire in order to determine and then adjust a light color. However, a disadvantage of this prior art is that each characteristic of the light to be produced, for example, light color and light intensity, must be coded and decoded, requiring programmed logic to be implemented in the control unit and in each luminaire, which increases investment costs and technical effort. These lighting devices are, therefore, not well suited for robust applications with a large number of luminaires to illuminate large indoor spaces.

From DE10 2018 115 672A1, an operating device for operating multiple lighting means on a two-pole output connection is known. The operating device has a switching regulator connected to the two-pole output terminal for providing a voltage and a current for operating the lighting means and a control device for controlling a light mixture of the light emitted by the lighting means, the control device assigning different voltages and/or currents to different light mixtures accordingly and controlling the switching regulator in such a way that it provides a voltage or a current at the two-pole output terminal which is assigned to a light mixture to be set. In this previously known control method, coding with a pulse width modulation or the on and off time duration of the supply voltage is used to encode lighting information that is decoded using an assignment rule and, therefore, can be used to control a desired lighting situation. However, even in this embodiment, programmed logic or high-band and low-pass filters are required in each luminaire for the purpose of matching with the assignment rule, which increases the investment costs and the technical effort.

SUMMARY OF THE INVENTION

The invention is, therefore, based on the problem of providing an improved solution, which addresses at least one of the problems mentioned. In particular, it is the object of the invention to provide a solution that reduces the material costs for a lighting device and the installation costs for setting up a lighting device.

According to a first aspect, the aforementioned problem is solved by an illumination device, in particular for illuminating an animal husbandry device, comprising a light source arrangement with a first light source and a second light source and optionally further light sources, wherein the first light source and the second light source and the optionally further light sources are designed to emit light, preferably with wavelengths differing from one another and/or colors differing from one another, in particular, red and white, a luminaire comprising the light source arrangement and a logic module which is signal-connected to the light source arrangement, wherein the logic module is configured to receive an electrical power supply signal via a supply line, to read a frequency of a signal from the electrical power supply signal, compare the frequency of the signal with data stored in the logic module, and in dependence on the comparison between the frequency of the signal and the data stored in the logic module to determine one channel coded in the frequency or several channels coded in the frequency, in dependence on the channel or channels coded in the frequency to enable electrical power to the first light source such that the first light source is supplied with the electrical power from the power supply signal and emits light, or to block electrical power to the first light source such that the first light source is not supplied with the electrical power from the power supply signal and does not emit light, and depending on the channel or channels coded in the frequency, to enable an electrical supply to the second light source, such that the second light source is supplied with the electrical energy electrical energy from the power supply signal and emits light, or to block, such that the second light is not supplied with the electrical power from the power supply signal and does not emit light.

An animal housing device for laying hens preferably comprises a house and at least one aviary, in particular an aviary for laying hens.

The lighting device according to the invention is based on a light control principle particularly adapted for such animal housing devices. For this purpose, the light is supplied with an energy supply signal that has color information in the form of a frequency. The power supply signal is received by the logic module and the frequency is read out by the logic module to obtain the channel information encoded therein, which preferably comprises color information. Depending on this read-out channel information, the logic module now controls light sources of the luminaire assigned to the corresponding channel. The channel information can therefore be understood to contain color information. By coding as channel information, however, beyond the direct color assignment of a coding, it is possible in a lighting system to distinguish between several luminaires which differ from each other in that light sources with different colors are assigned to a channel. For example, the first luminaire or group of luminaires can have white assigned to channel A, whereas a second luminaire or group of luminaires has red assigned to channel A. If channel "A" is now sent in code via the power supply signal sent to both luminaires or groups of luminaires together, the first luminaires generate white light and the second luminaires generate red light.

The lighting device according to the invention is based on a light control principle particularly adapted for such animal housing devices. For this purpose, the light is supplied with an energy supply signal that has color information in the form of a frequency. The logic module receives the power supply signal and the frequency is read out by the logic module to obtain the channel information encoded therein, which preferably comprises color information. Depending on this read-out channel information, the logic module now controls light sources of the luminaire assigned to the corresponding channel. The channel information can, therefore, be understood to contain color information. However, by coding as channel information, it is possible, beyond the direct color assignment of a code, to use several luminaires in a lighting system that differ from each other in that light sources with different colors are assigned to a channel. For example, the first luminaire or group of luminaires can have white assigned to channel A, whereas a second luminaire or group of luminaires has red assigned to channel A. If channel "A" is now sent in code via the power supply signal sent to both luminaires or groups of luminaires together, the first luminaires generate white light and the second luminaires generate red light.

In a simple embodiment, either one of two different light sources or both light sources can be supplied with the power supply signal, so that a total of three colors (10, 01, 11) can be controlled in one light source arrangement. This can likewise be done with a light source arrangement having three differently colored light sources, in which case seven controllable colors result: (001, 010, 011, 100, 101, 110, 111). In addition to this binary control (on/off) of the individual light sources, in advanced embodiments of the invention, the light sources can also be controlled with a controllable illuminance. In a simple design, the first, second, and possibly further light sources are assigned a uniform energy supply signal, so that the resulting light and/or the light color of the light emitted by the light sources is determined by the composition of the light source arrangement.

A frequency with a channel encoded in the frequency preferably contains channel information about one or more channels. A channel is understood to be a channel for controlling the first, second, and possibly further light sources.

For example, in a first channel, the first light source may be controlled and enabled so that the first light source emits light and the second light source may be blocked so that the second light source does not emit light. Further, for example, in a second channel, the first light source can be blocked so that the first light source does not emit light and the second light source can be controlled and enabled so that the second light source emits light. And further, for example, in a third channel, the first light source and the second light source can be controlled and enabled such that the first light source and the second light source emit light. There may be a plurality of channels, and the channels may have different control options for driving the light sources. This means that different light sources in particular can be controlled in different combinations.

The power supply signal can be passed through to the LEDs selectively and directly, in which case the electrical supply from the logic module to the light source has the same frequency and, if applicable, the same duty cycle as the power supply signal, and the logic module merely controls which light sources are supplied with the electrical energy and which are not. This allows, for example, a color control with three or seven controllable colors with two or three light sources per light source arrangement and—by changing the duty cycle—also a control of the illuminance of these defined colors. The logic module can also be designed to read the frequency of the power supply signal and determine a channel and/or a color based on a comparison with pre-stored data—for example, in a stored look-up table or based on a defined assignment algorithm—of this frequency. Based on the channel and/or the color determined in this way, the individual light sources are then controlled at a respective duty cycle individually controlled by the logic module, whereby the frequency of the power supply signal for the electrical supply of the light sources can be maintained. By this decoding of a channel and/or a color from the frequency and individual control of the light intensity of each individual light source of a light source array, a light source control and/or a color control over the entire color spectrum is possible. is made possible.

The first, second, and, if applicable, further light sources are preferably designed as light emitting diodes. It is preferred if the light sources emit light with different wavelengths and/or different colors. For example, three different light-emitting diodes with the colors red, green, and blue (e.g., RGB) can be used, whereby different colors can be generated by means of different combinations of the different light-emitting diodes. The light sources combined in a light source arrangement thereby produce a desired color and luminosity by color mixing. A luminaire can also contain several light source arrangements that are controlled by a common logic module in order to improve the luminaire's illuminance and light distribution. The light source arrays can be controlled uniformly via the same channels so that they emit light of the same color and wavelength. However, the light sources of the multiple light source arrangements of a luminaire can also be controlled via different channels or in an interchanged manner via the channels, so as to generate different light colors/wavelengths within a luminaire with a single control signal. A luminaire can also comprise several logic modules, each of which controls one or more light source arrangement in order to obtain different light colors or wavelengths from one luminaire.

The frequency of the electrical power supply signal is preferably read out by means of a frequency evaluation module, where this module can be a programmable or non-programmable microcontroller, in particular, an analog high-pass or low-pass filter. The logic module preferably comprises such a device for frequency evaluation. It is preferred if the logic module is located immediately adjacent to the light sources controlled by the logic module. The data stored in the logic module preferably comprises information on frequencies or frequency ranges and switching commands assigned to these frequencies or frequency ranges in order to control the light sources with the logic module.

A first advantage of such a lighting device is that with the power supply signal, which is provided to supply the light sources, an electrical power supply is provided, which by means of the frequency of the power supply signal sends light source control information to the logic module, whereby the light sources can be switched as desired. Thus, the power supply and the data supply are provided in one electrical power supply signal, without the need for data transmission of control information and/or control commands running separately from the power supply. This enables cost-effective control of a lighting device, with only a two-wire line being required to supply power and information. The material requirement for the supply line and the installation effort and thus the material and installation costs are, therefore, considerably reduced.

Another advantage is that the logic modules only need to have a low level of control intelligence and are, therefore, small and inexpensive components. This means that the luminaires can be dimensioned to be small and cost-effective.

An advantageous lighting installation can, therefore, be created in which a plurality of luminaires, each having a logic module and a plurality of light source arrangements, are installed in a large building by means of a two-wire supply line and are supplied with power and the necessary data information to provide barn illumination with optionally one of at least two different colors of effect.

The design of the lighting device also makes it possible for lights equipped with different light sources can be controlled differently by setting the data stored in the respective logic module can be set individually in each case. For example, a first logic module can switch on an LED of a first color at a certain frequency. LED of a first color can be switched on by a first logic module at a specific frequency, so that the LED of the first color emits light, and in another logic module an LED of the first color cannot be switched on at the same frequency, so that this LED of the first color does not emit any light. Different combinations of stored data in the logic modules can lead to different switching of the light sources. The lighting device can thus be individually adapted to the desired illumination or the desired illumination or the desired illumination scheme.

It is particularly preferred if the illumination device further comprises a control device comprising a light determination unit, in particular, a user interface, for determining a channel to be encoded in a frequency and/or a color to be encoded in a frequency and/or for determining a target illuminance, and which is adapted to
- to modulate the frequency on the power supply signal, in particular, as a function of the channel or multiple channels to be coded in the frequency and/or the color or multiple colors to be encoded in the frequency, and/or
- to modulate a duty cycle and/or a pulse duration on the power supply signal, in particular, depending on the defined target illuminance, and to control the duty cycle and/or the pulse duration of the power supply signal, such that the power supply of the light sources for which the electrical supply is enabled by the logic module, is provided with the electrical energy with the assigned duty cycle and/or the assigned pulse duration from the power supply signal.

Such a control device serves as an operating unit for a user to control the lighting of the lighting device, in particular, to set a desired color or illuminance or to program time sequences. The control device can have its own user interface for this purpose, which is used to enter control commands. Alternatively or additionally, the control device may also have a data interface, via which control commands are received from another operator terminal, for example, from a central control computer that controls lighting, air conditioning and, if necessary, other functions in the barn building.

Preferably, the voltage and/or the current is controlled such that the electrical energy has the assigned frequency. If the voltage is controlled, then preferably the voltage signal is in the form of a square wave signal, whereby the voltage alternately has a value U1 or a value U0. With a voltage with the value U0, the voltage is preferably 0 V. For example, in the case of a voltage with the value U1, the voltage can be 48 V. Preferably the signal of the electrical energy has a period duration which characterizes the time interval, in which the constant voltage U1 is present once and then the constant voltage U0 is voltage U0 is present. Preferably, the signal of the electrical energy has a pulse duration, whereby the pulse duration is the duration during which the constant voltage U1 is present within a period duration. The frequency corresponds to the reciprocal of the period duration. The duty cycle corresponds to the value that results from dividing the pulse duration by the period duration. pulse duration by the period duration.

By adjusting the duty cycle, the illumination intensity can be set. Thus, a high duty cycle results in a high radiation intensity and a low duty cycle results in a low radiation intensity. low duty cycle results in a low radiation intensity.

An advantage of such an illumination device is that by adjusting the frequency and the duty cycle, specific light sources can be controlled as well as the radiation intensity of the light sources that are switched on, can be adjusted. Thus, a dimming function of the light sources is possible only by change of the duty cycle. The logic module, therefore, only needs to compare and interpret the frequency of the supply voltage (or current) with predetermined values to determine a light color from it, whereas no such logic evaluation is required for the luminous intensity, since the luminous intensity results in direct effect from the duty cycle or pulse duration. The need for an elaborate logic module in each luminaire to control light color and intensity or the need for high-pass, band-pass, and low-pass filters is, therefore, eliminated.

In a particularly preferred embodiment, the logic module is adapted to control the first and second light sources and the optionally further light sources such that the first light source is supplied with a first portion of the electrical energy from the power supply signal and the second light source is supplied with a second portion, different from the first portion, of the electrical energy from the power supply signal and each of the optionally further light sources is supplied with a corresponding further portion of the electrical energy from the power supply signal, and to control the first and the second and, if applicable, the further components of the electrical energy in such a way that a first radiation intensity of the first light source and a second intensity, different from the first intensity, of the second light source and, optionally radiation intensities of the further light sources are generated, whose mixture causes a radiation with the color coded in the frequency.

Preferably, the first portion of the electrical energy and the second portion of the electrical energy and, if applicable, the corresponding further portion of the electrical energy are adjustable independently of each other. Preferably, the first portion of the electrical energy and the second portion of the electrical energy and, if applicable, the corresponding further portion of the electrical energy can have different energies.

In such an embodiment, the entire color spectrum between the two colors of the two light sources can be generated by mixing the light from two different light sources, and, in the case of three light sources with different elemental colors (e.g., RGB), the entire color spectrum can be generated by assigning different power supply signals or portions of the power supply signals to the light sources are assigned different power supply signals or portions of the power supply signals.

In such an embodiment, it is particularly advantageous that the different light sources can be operated with different radiation intensities. In combination with light sources of different colors, this enables illumination with light of colors from a wide color spectrum.

It is further preferred if the logic module is adapted to in dependence of the channel coded in the frequency or of the several channels coded in the frequency to enable an electrical supply to optional further light sources, so that the optional further light sources are supplied with the electrical energy or a portion of the electrical energy and emit light, or to block said electrical supply such that the optionally further light sources are not supplied with the electrical energy and do not emit any light.

It is further preferred if the lighting device comprises: a supply line for conducting the electrical power supply signal with exactly two electrical lines, whereby the logic module, and preferably the first light source and the second light source and, the optional further light sources, are arranged on the supply line and are electrically connected to the supply line, and/or a reverse polarity protection, in particular, in the form of a rectifier, which is electrically connected to the logic module and passes the electrical power supply signal to the logic module with a predetermined polarity.

Such polarity reversal protection can be used to protect the logic module from a power supply with an incorrect polarity. Furthermore, the LEDs can be protected from a power supply with an incorrect polarity. Preferably, the reverse polarity protection is arranged directly next to the logic module and/or in the luminaire. Preferably, the reverse polarity protection is an electrical reverse polarity protection. Further preferably the polarity reversal protection is electrically arranged between the supply line and the logic module.

Preferably, the supply line is designed to be supplied with a DC voltage, in particular, a clocked DC voltage with a specific, controllable frequency and a specific, controllable duty cycle. The frequency is used for color information transmission and the duty cycle for illuminance information transmission. Preferably, the supply line comprises an insulating sheath, the two electrical lines being disposed within the insulating sheath. This allows the two electrical wires to be protected from environmental influences, in particular, from water. Furthermore, the two electrical wires can thus be electrically insulated from each other. It is preferred if the insulating sheathing comprises a plastic, in particular in the form of an elastomer, or consists thereof.

It is further preferred if the luminaire comprises several light source arrangements, or a plurality of luminaires, each comprising a logic module and at least one light source arrangement, preferably a plurality of light source arrangements, wherein the one or more luminaires preferably comprise a contacting component designed to penetrate an insulating sheath of a supply line and are electrically connected by means of this contacting component to a supply line, preferably to a supply line according to the preceding embodiment. According to this embodiment, a luminaire comprises a plurality of light source arrangements which may, for example, be arranged spaced apart from one another in a longitudinal direction and are all supplied by the one logic module of the luminaire. In particular, a plurality of such lights may be provided, each of which then includes a logic module.

Preferably, the contacting component can penetrate an insulating sheath of the supply line, whereby an electrical contact is established between the contacting component and the electrical wires of the supply line. Still further, it is preferred that the power supply signal is a pulse width modulated signal and the pulse width modulated signal has a duty cycle and a frequency, wherein preferably the electrical voltage of the power supply signal changes with the frequency of the signal between a first voltage value, preferably 100% of the electrical voltage, and a second voltage value, preferably 0% or −100% of the electrical voltage, and/or wherein preferably the electric current of the power supply signal changes with the frequency of the signal between a first current value, preferably 100% of the electric current, and a second current value, preferably 0% or −100% of the electric current.

Furthermore, it is preferable if the control device is adapted to assign a duty cycle to the power supply signal as a function of the target illuminance, so that the electrical power supply to the light sources takes place in the form of a signal with the assigned duty cycle, and/or to assign a pulse duration to the power supply signal as a function of the target illuminance, so that the electrical power supply of the light sources with electrical energy takes place in the form of a signal with the assigned pulse duration, and/or to assign a period duration to the power supply signal as a function of a target illuminance, so that the electrical supply of the light sources with electrical energy takes place with electrical energy in the form of a signal with the assigned period duration.

Furthermore, it is preferred if a frequency is assigned to the power supply signal as a function of a color value and/or a time value, in particular, as a function of the time of day, so that the supply of the light sources with the power supply signal is controlled as a function of the color value and/or the time value, in particular, the time of day, wherein said supply, in particular, takes place with portions of the power supply signal or is completely enabled or blocked.

Thus, in an advantageous way, the frequency can be changed automatically according to a certain program. Furthermore, a duty cycle can preferably be assigned to the electrical energy as a function of a time value, in particular, as a function of the time of day. Thus, in an advantageous way, the beam intensity can be changed automatically according to a certain program.

It is further preferred if the assigned frequencies are at least 300 Hz, particularly preferably at least 400 Hz, especially at least 500 Hz and/or the assigned frequencies are at most 2500 Hz, particularly preferably at most 2250 Hz, in particular at most 2000 Hz.

With such a minimum frequency, when the frequency is passed on to the light sources, flicker-free light can be produced that is perceived as species-appropriate for animals, especially for poultry (birds), which has a beneficial effect on animal welfare. With such a maximum frequency, aggressive behavior, high mortality rates, and, thus, performance losses can be avoided and unfavorable electromagnetic radiation can be avoided.

It is further preferred if the control device is signal-connected to a driver and the driver is connected to a supply line, preferably a supply line according to one embodiment of the invention, the driver applying the power supply signal to the supply line, wherein the driver preferably has a nominal output voltage of not more than 48 V.

The nominal output voltage may alternatively have, for example, 24 V or a different value. Preferably, the control device and the driver are combined in one component.

Still further, it is preferred that at least one of the light sources, preferably all light sources, is/are designed as light emitting diode(s) and wherein preferably a light source arrangement comprises at least two light emitting diodes with different colors, wherein the colors are selected from the following group: red, green, blue, white, ultraviolet.

For example, the light source arrangement can comprise three LEDs of the colors red, green and blue. respectively. This allows a comprehensive mixing of the colors of the entire color spectrum.

Furthermore, it is preferred if the lighting device and/or the supply line has a length of at least 1 m or at least 5 m or at least 10 m or at least 15 m or at least 20 m.

Furthermore, it is preferred if the control device is adapted to control the application of electrical energy to the supply line such that the application of electrical energy to the supply line in the form of a pulse-width modulated signal comprises a time-varying pulse-width modulated signal and the signal proceeds according to a repetitive pattern, the pattern preferably having a duration of 24 hours. For example, the signal may start up according to a repeating day-night scheme. Preferably, this involves simulating natural illumination by the sun. It is preferred if at any time of the time axis of the scheme a minimum brightness is generated by means of the light sources.

According to a second aspect, the aforementioned task is solved by a control unit for controlling a lighting device according to one of the preceding claims, wherein the control unit comprises a connection unit for a supply line, preferably a two-core supply line, and is adapted to apply an energy supply signal to the connection unit, and to modulate at least two alternative different frequencies and/or two alternative different duty cycles and/or two alternative different pulse durations onto the energy supply signal, so that the application of the energy supply signal to the supply line takes place in the form of at least one of at least two different energy supply signals, wherein the application of the power supply signal to the supply line preferably takes place with a predetermined, time-controlled scheme and the scheme preferably has a duration of 24 hours.

According to a third aspect, the aforementioned task is solved by a method for controlling a lighting device, preferably a lighting device according to one of the preceding claims, comprising applying a power supply signal in the form of a signal having an assigned frequency to a supply line for power transmission and signal transmission, which preferably has exactly two electrical lines, reading out the frequency of the received power supply signal by means of a logic module arranged in a luminaire, which logic module is arranged on the supply line and is electrically connected to the supply line, comparing the frequency of the received power supply signal with data stored in the logic module, controlling a first light source arranged in the luminaire, wherein, as a function of the comparison between the frequency of the power supply signal and the data stored in the logic module, an electrical supply to the first light source is enabled so that the first light source is supplied with the electrical energy or is blocked so that the first light source is completely, partially, or not supplied with the power supply signal and thereby emits light or does not emit any light, controlling a second light source arranged in the luminaire, wherein, as a function of the comparison between the frequency of the power supply signal and the data stored in the logic module, an electrical supply to the second light source is enabled so that the second light source is supplied with the electrical energy or is blocked so that the second light source is completely, partially, or not supplied with the power supply signal and thereby emits light or does not emit light.

It is particularly preferred if the method comprises: Controlling at least one further light source arranged in the luminaire, whereby in dependence on the comparison between the frequency of the power supply signal and the data stored in the logic module, an electrical supply to the further light source is enabled, so that the further light further light source is supplied with the electrical energy, or is blocked, so that the further light source is completely, partially or not at all supplied with the signal and thereby emits light or does not emit any light.

It is further preferred if the method comprises: controlling an illumination intensity of the first, second, and, if appropriate, further light sources, the power supply signal being assigned a duty cycle and/or a pulse duration, in particular, as a function of a defined target illuminance, and the duty cycle and/or the pulse duration of the power supply signal being controlled so that the power supply of the light sources, for which the power supply signal is enabled fully or reduced by the logic module, is effected with the full or reduced power supply signal with the assigned duty cycle and/or the assigned pulse duration.

According to a fourth aspect, the aforementioned task is solved by a use of a lighting device of the previously described design within a stable building for livestock, in particular, within a stable building for keeping laying hens. An advantage of such a use of a lighting device within a stable building is due to the fact that the described lighting device is relatively inexpensive. This is a considerable advantage, in particular, for livestock buildings, in which typically relatively long lighting devices with many light sources are required.

Another advantage of such use of a lighting device within a barn building is that the lighting that can be produced with the lighting device allows for both color variation and dimming, which can produce light that is beneficial to the animals depending on the time of day. This can be particularly beneficial to animal welfare.

An additional advantage of such a use of a lighting device within a stable building is due to the fact that the frequencies used are in a range in which the light generated is perceived by the animals as flicker-free, on the one hand, and in which no electromagnetic radiation of an undesirable level with the associated adverse effects occurs, on the other hand.

Particularly preferred is the use of a lighting device for illuminating a floor area below an aviary and/or a tier of an aviary and/or a feeding tray, the lighting device preferably being connected to the aviary along the aviary.

With respect to the advantages, embodiments, and embodiment details of the various aspects of the solutions described herein and their respective possible embodiments reference is also made to the description regarding the corresponding features, details, and advantages of the respective other aspects and their further developments.

BRIEF DESCRIPTION OF THE DRAWINGS

Preferred embodiments are explained by way of example with reference to the accompanying Figures. They show.

DETAILED DESCRIPTION OF THE EMBODIMENTS

Figure 1:
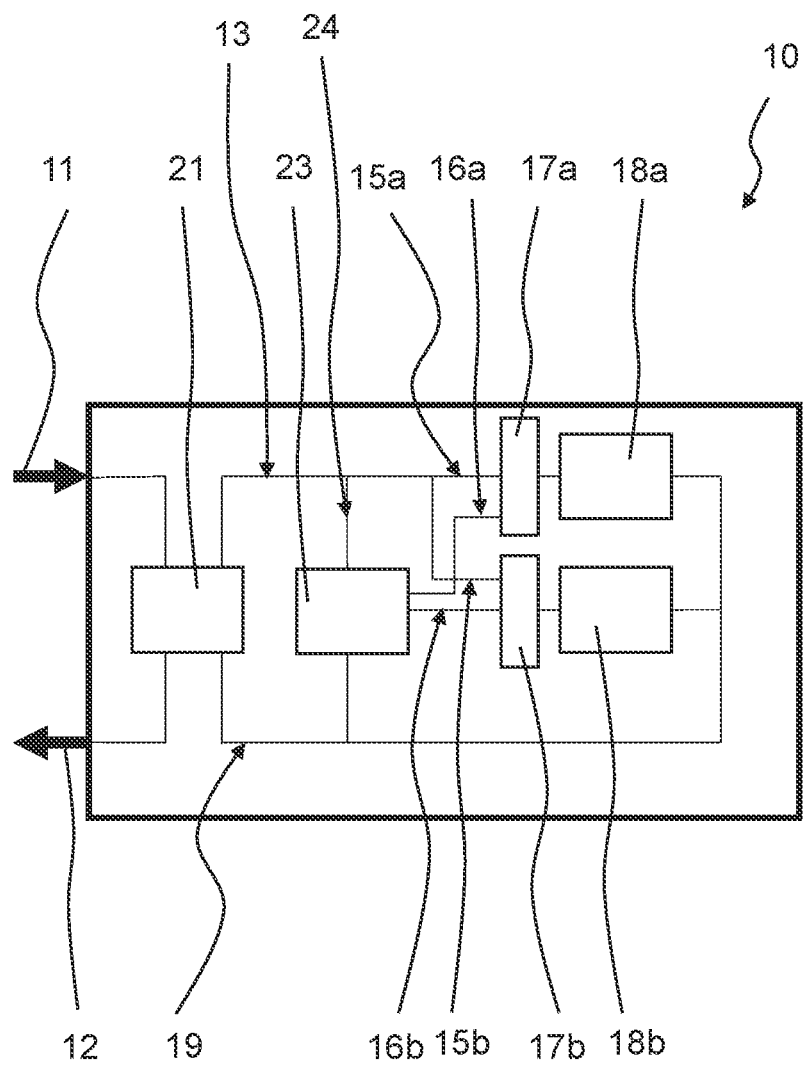
FIG. 1 is a schematic view of an illumination device.

FIG. 1 shows a lighting device having a light 10 connected to a supply line (not shown) by a first wire 11 and a second wire 12. When electrical power is applied to the supply line, the lighting device is supplied with electrical power via the first wire 11 and the second wire 12. Thus, the first wire 11 and the second wire 12 form the contacting to the supply line. The first wire 11 and the second wire 12 are connected to an electrical polarity reversal protection 21. The polarity reversal protection 21 in the form of a rectifier ensures that the polarity is correctly applied to the lines 13 and 19 connected to the polarity reversal protection 21. A logic module 23 is supplied with power via line 13, which is connected to the polarity reversal protection 21, and via the further line 19, which is also connected to the polarity reversal protection 21. The logic module 23 includes a logic module evaluation component. The logic module 23 receives, via a line 24 connected to the line 13, the signal of the electrical energy applied to the supply line. The logic module evaluation component of the logic module 23 is configured to read out the frequency of the signal of the electrical energy. The logic module 23 has a first switching line 16a connected to a first switch 17a, and a second switching line 16b connected to a second switch 17b. The switches 17a and 17b can, for example, be formed as a semiconductor switching element, e.g., with a transistor. It is also conceivable that the switches 17a, 17b are designed integrally together with the logic module 23 as an electronic component with an integrated switching element.

The first switch 17a is connected to the line 13 via a line 15a, and the second switch 17b is also connected to the line 13 via a line 15b. The first switch 17a is connected to a first light emitting diode 18a via a line and can be switched to an open position by the logic module 23 via the first switch line 16a, wherein there is no electrical connection between the line 15a and the first light emitting diode 18a, or switched to a closed position, wherein an electrical connection is made between the line 15a and the first light emitting diode 18a so that the first light emitting diode 18a is supplied with electrical power and emits light. The second switch 17b is connected to a second light emitting diode 18b via a line and can be switched to an open position by the logic module 23 via the second switch line 16b, wherein there is no electrical connection between the line 15b and the second light emitting diode 18b, or switched to a closed position, wherein an electrical connection is made between the line 15b and the second light emitting diode 18b so that the second light emitting diode 18b is supplied with electrical power and emits light.

For example, the first light emitting diode 18a may be a red LED and the second light emitting diode 18b may be a white LED. The data stored in the logic module 23 may contain, for example, the information that, at a frequency of the electrical energy signal of 500 Hz only the red LED—i.e. only the LED 18a—is to be switched on, at a frequency of the electrical energy signal of 1000 Hz, the red LED and the white LED—i.e. the first LED 18a and the second LED 18b—are to be switched on, and at a frequency of the electrical frequency of the electrical energy signal of 1500 Hz, only the white LED—i.e. the second LED 18b.

If power is supplied via the supply line with a signal of electrical power having a frequency of 500 Hz, the first switch 17a is set to the closed position by the logic module 23 via the first switching line 16a so that the first LED 18a is supplied with power and emits light. The second switch 17b is switched to the open position so that the second LED 18b is not supplied with electrical energy and does not emit light.

If power is supplied via the supply line with a signal of electrical energy having a frequency of 1000 Hz, the first switch 17a is set to the closed position by the logic module 23 via the first switching line 16a so that the first LED 18a is supplied with electrical energy and emits light. Also, the logic module sets the second switch 17b to the closed position via the second switch line 16b so that the second LED 18b is supplied with electrical energy and emits light.

If power is supplied via the supply line with a signal of the electrical energy with a frequency of 1500 Hz, the second switch 17b is set to the closed position by the logic module 23 via the first switching line 16b, so that the second LED 18b is supplied with energy and emits white light. The first switch 17a is switched to the open position, so that the first LED 17a is not energized and does not emit light.

Figure 2:
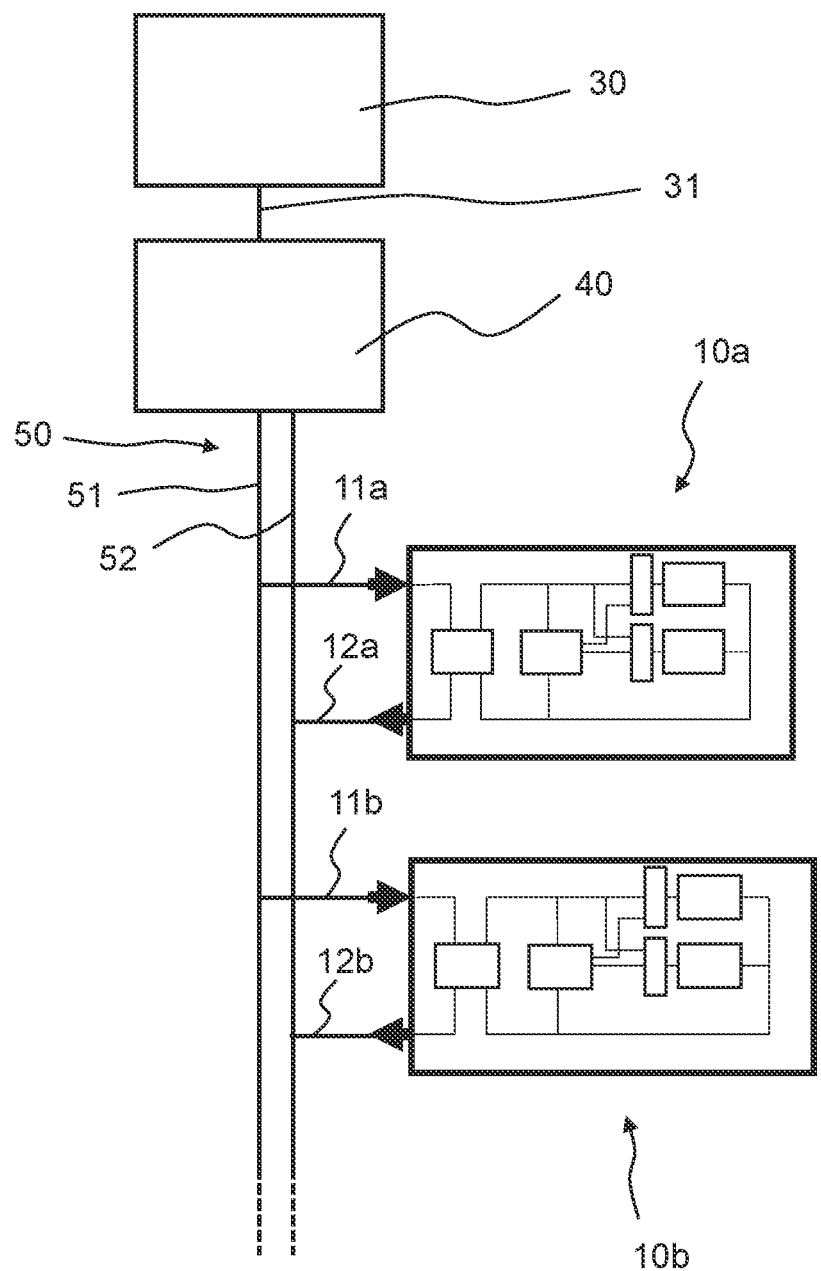
FIG. 2 is a schematic view of an illumination device with a control device, a driver and a supply line.

FIG. 2 shows a lighting device with two luminaires 10a and 10b, which are supplied with electrical energy via a supply line 50. A control device 30 is connected to a driver 40 via a connection line 31. The control device 30 is designed to assign a frequency to the electrical energy to be applied to the supply line 50. In this case, the frequency of the signal of the electrical energy is assigned in dependence on the color to be generated with the light sources or on the colors to be generated with the light sources. The control device also assigns a duty cycle to the electrical energy. By adjusting the duty cycle, the pulse duration is adjusted so that the illumination intensity can be varied. The signal of the electrical energy with a certain frequency and duty cycle specified by the control device 30 is generated by the driver 40. The driver 40 applies the appropriate electrical energy to the supply line 50 connected to the driver 40. The supply line has a first line 51 and a second line 52. Each of the lights has a first line 11a, 11b connected to the first line 51 of the supply line 50 and a second line 12a, 12b connected to the second line 52 of the supply line 50. Thus, the luminaires 10a, 10b are supplied with the electrical energy via the supply line 50, which receives a signal at a predetermined frequency and a duty cycle predetermined by the control device 30. The structure of the luminaires 10a, 10b preferably corresponds to the structure described in detail in FIG. 1. Along the supply line 50, in particular, over a meter, a plurality of further luminaires can be connected in the same way as the luminaires 10a, 10b.

Figure 3A:
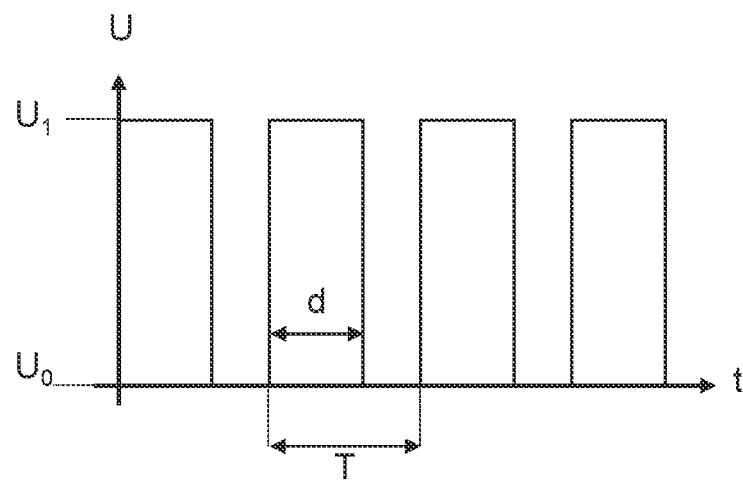
FIG. 3a is a diagram showing a signal of electrical energy with a second pulse duration.

FIG. 3a shows a voltage signal of an electrical energy which can be applied to a supply line. The voltage U is plotted over the time t. The voltage signal is in the form of a square-wave signal, with the voltage alternately having the value U1 or the value U0. For a voltage with the value U0, the voltage is 0 V. For a voltage with the value U1, the voltage is 48 V, for example. The period duration T characterizes the time interval in which the constant voltage U1 is present once and then the constant voltage U0. The pulse duration d is the duration for which the constant voltage U1 is present within a period duration. The frequency corresponds to the reciprocal of the period duration. The duty cycle corresponds to the value obtained by dividing the pulse duration d by the period duration T.

Figure 3B:
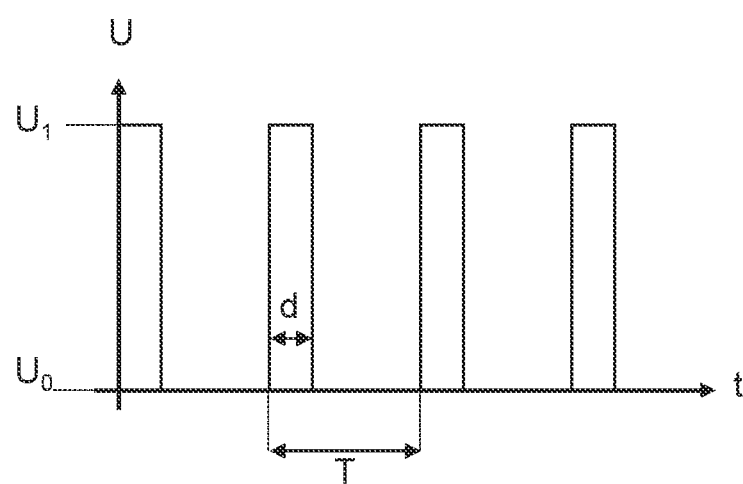
FIG. 3b is a diagram showing a signal of electrical energy with a first pulse duration.

FIG. 3b also shows a voltage signal with the same designations as described in FIG. 3a, where the period duration and the voltage values U1 and U0 are the same as in FIG. 3a, with the difference that the pulse duration is much shorter for the same period duration. Compared to the signal shown in FIG. 3a, this has the consequence that the illuminance of the light sources receiving the electrical energy with this signal is lower.

Figure 4A:
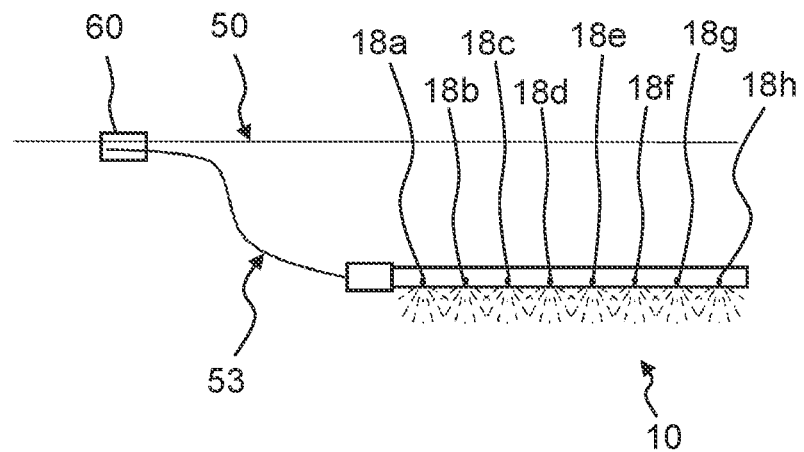
FIG. 4a is a schematic view of a luminaire with multiple light sources connected to a supply line.

FIG. 4a shows a luminaire 10 that is electrically connected to a supply line 50 via a line 53. The connection between the line 53 and the supply line is made by a contacting component 60. The luminaire 10 includes a plurality of light sources 18a-h, which may be different colored LEDs. The light sources are controlled by a logic module provided in the luminaire, depending on the frequency of the signal of electrical energy reaching the luminaire 10 via the supply line 50 and the line 53.

Figure 4B:
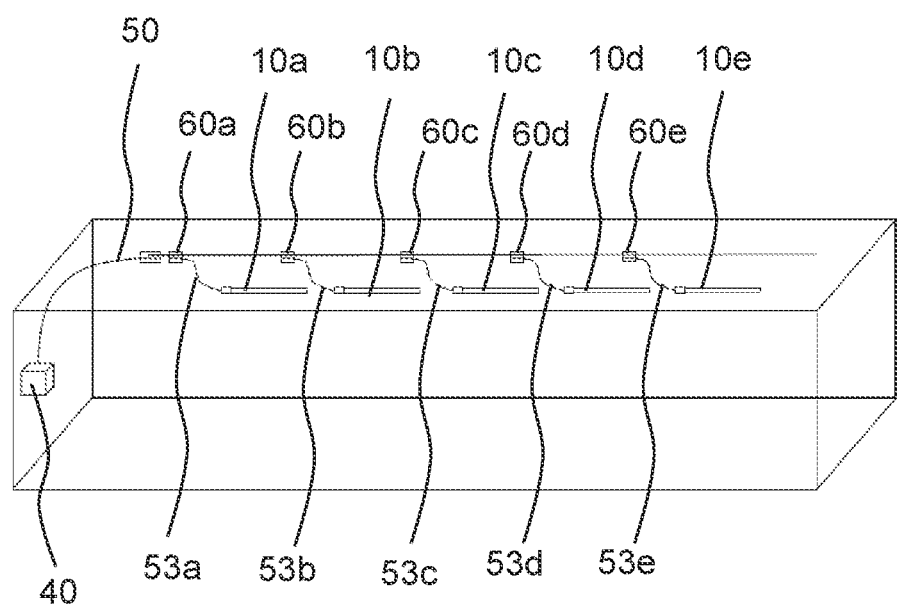
FIG. 4b is a schematic view of a plurality of lights connected to a supply line.

FIG. 4b shows a driver 40 that applies an electrical energy signal to a supply line 50. A plurality of lines 53a-e to a plurality of luminaires 10a-e are connected to the supply line 50. The luminaires 10a-10e may be like the luminaire described in FIG. 4a.

Figure 5A:
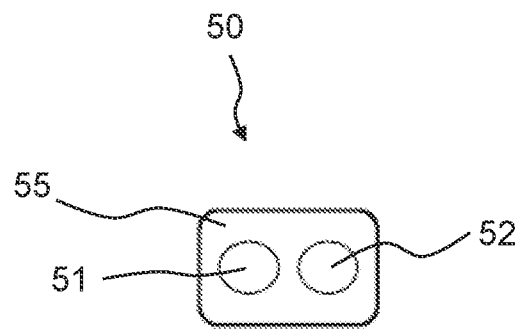
FIG. 5a is a schematic view of a cross section of a supply line.

FIG. 5a shows a cross section of a supply line 50 with exactly two wires, namely a first wire 51 and a second wire 52. The first wire 51 and the second wire 52 are arranged in an insulating sheath 55. Thus, on the one hand, the first wire 51 and the second wire 52 are electrically insulated from each other. In addition, the first wire 51 and the second wire 52 are protected from environmental influences, in particular, from water, by means of the insulating sheath 55 surrounding these lines.

Figure 5B:
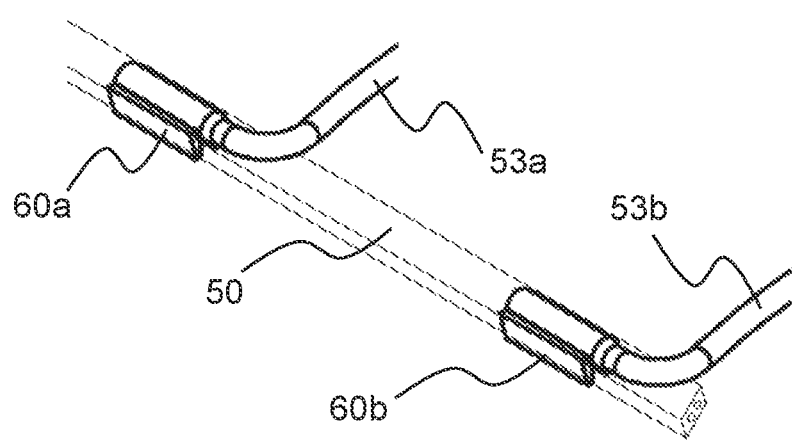
FIG. 5b is a schematic view of two connections between two luminaires and a supply line.

FIG. 5b shows a supply line 50 on which two lines 53a, 53b, each connected to lights (not shown), are arranged. The supply line 50 is designed as described in FIG. 5a, in particular, with a first and a second line. The connection between the lines 53a, 53b is made by means of contacting components 60a, 60b. These have contacting elements which can be inserted into the supply line by the contacting elements penetrating the insulating sheath 55 of the supply line 50 and one of the contacting elements being in contact with the first wire of the supply line and thus being electrically connected to the first wire of the supply line, and the other of the contacting elements being in contact with the second wire of the supply line and thus being electrically connected to the second wire of the supply line.

Figure 6A:
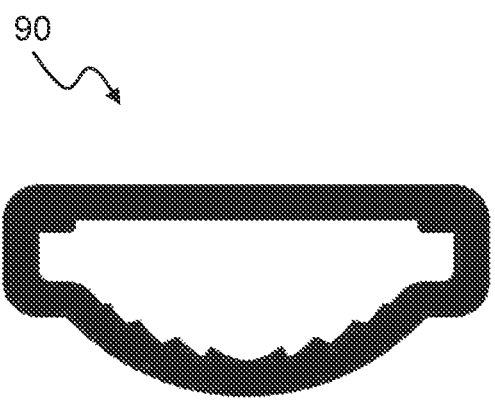
FIG. 6a is a schematic view of a cross-section of a housing of a luminaire.

FIG. 6a shows a cross section of a transparent housing 90 of a luminaire. With such a transparent housing 90, robust protection of the parts located in the housing, such as the light sources, is ensured. Furthermore, with such a design of the housing 90, an advantageous light distribution without glare is achieved. The glare effect is thereby reduced by a corresponding design of optical elements which are an integral part of the housing and which preferably extend in the interior of the housing 90. The optical elements thereby preferably form elements of an optical system according to a stepped lens or Fresnel lens principle.

Figure 6B:
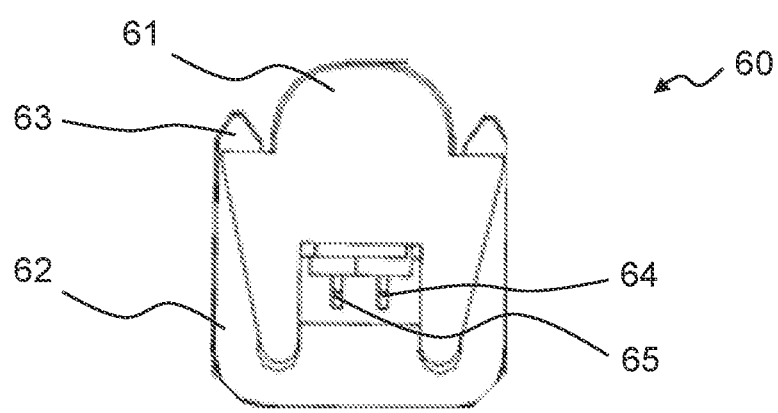
FIG. 6b is a schematic view of a cross section of a connection between a luminaire and a supply line.

FIG. 6b shows a cross section of a contacting component 60 connectable to a supply line 50 as described in FIG. 4a and FIG. 5b The contacting component 60 comprises a first component 61 and a second component 62. To install a contacting component 60 to a supply line 50, a supply line 50 is placed between the first component 61 and the second component 62. Two contacting members 64, 65 are disposed on the first component 61. The first component 61 and the second component 62 are then pressed onto each other, for example, by means of pliers, so that the contacting elements 64, 65 penetrate the insulating sheathing of the supply line and each of the contacting elements 64, 65 is connected to one of the wires of the supply line, thereby establishing an electrical connection to the supply line.

Figure 7:
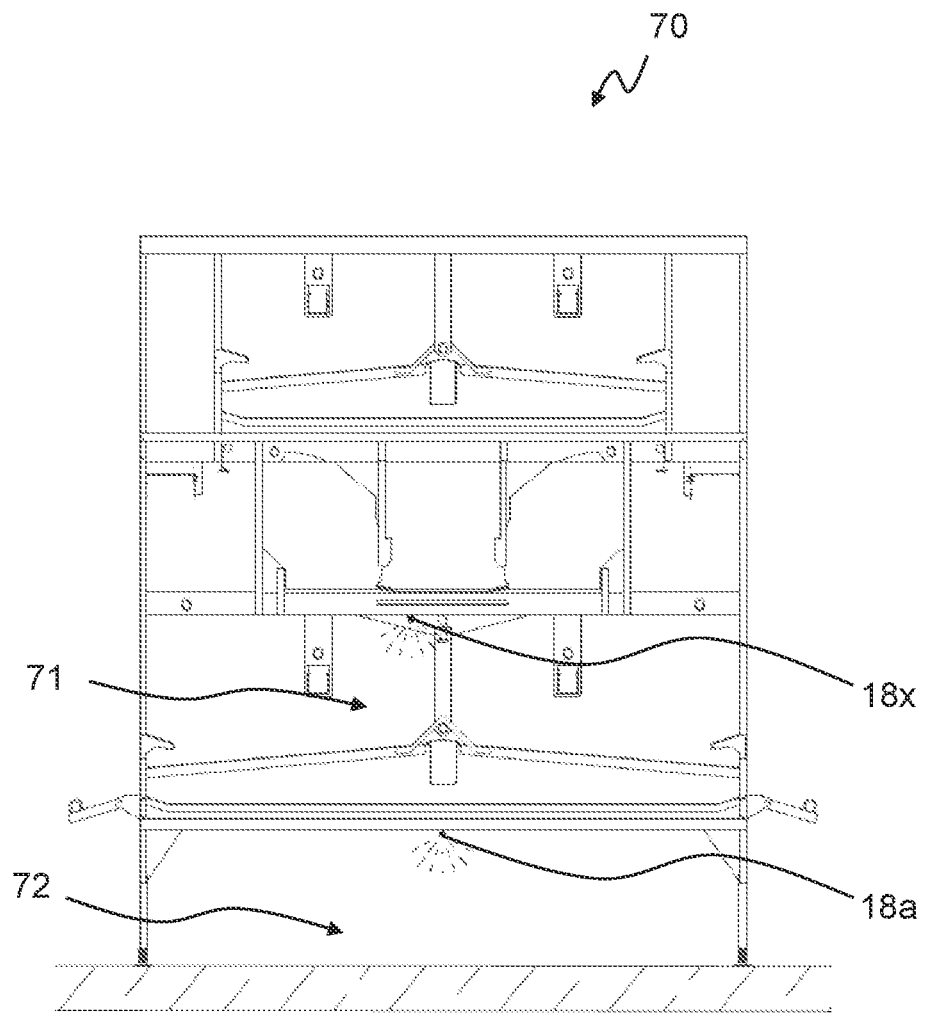
FIG. 7 is a schematic view of a cross-section of an aviary with two lighting devices.

FIG. 7 shows a cross section of an aviary 70 for a house, particularly for laying hens, having a plurality of levels. In order to illuminate the floor area 72, a light source 18a, which is part of a lighting device extending along the aviary and comprising a plurality of further light sources, is arranged in this plane. To illuminate the first plane 71, a light source 18x, which is part of another lighting device extending along the aviary and having a plurality of further light sources, is arranged in said plane.

Figure 8:
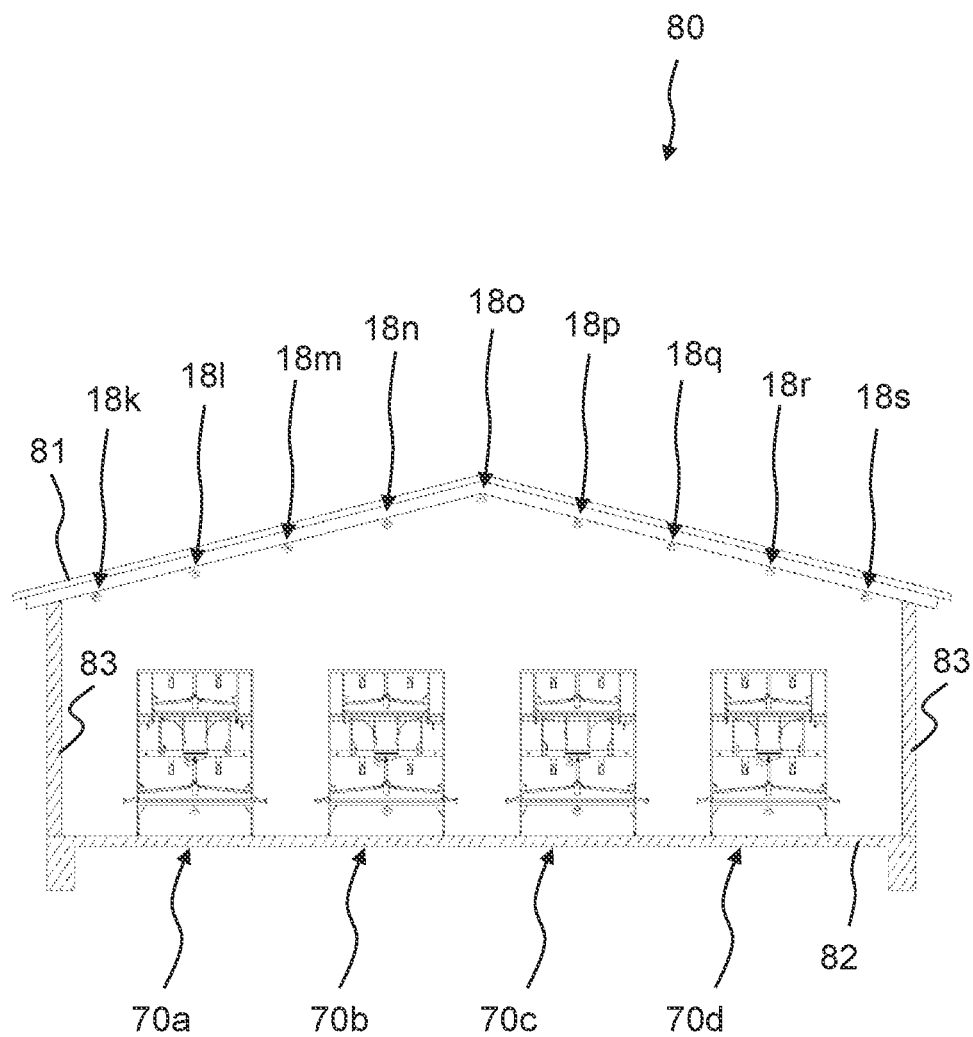
FIG. 8 is a schematic view of a cross section of a house for laying hens with multiple aviaries and multiple lighting fixtures.

FIG. 8 shows a cross section of a coop 80 for laying hens with a roof 81, side walls 83, and a floor 82. In the coop 80, four aviaries 70a-d arranged side by side, wherein each of the aviaries may have light sources and lighting devices as described in FIG. 7. Further, a plurality of light sources 18k-s are arranged on the inner side of the roof 81, which are part of one or more lighting devices. These light sources are used to illuminate the interior of the coop 80. In conjunction with the light sources arranged on the inside of the roof 81 and the light sources arranged on the aviaries 70a-d, the interior of the coop 80 and certain areas on and around the aviaries can be individually adapted and temporally be illuminated in a variable manner.

Figure 9:
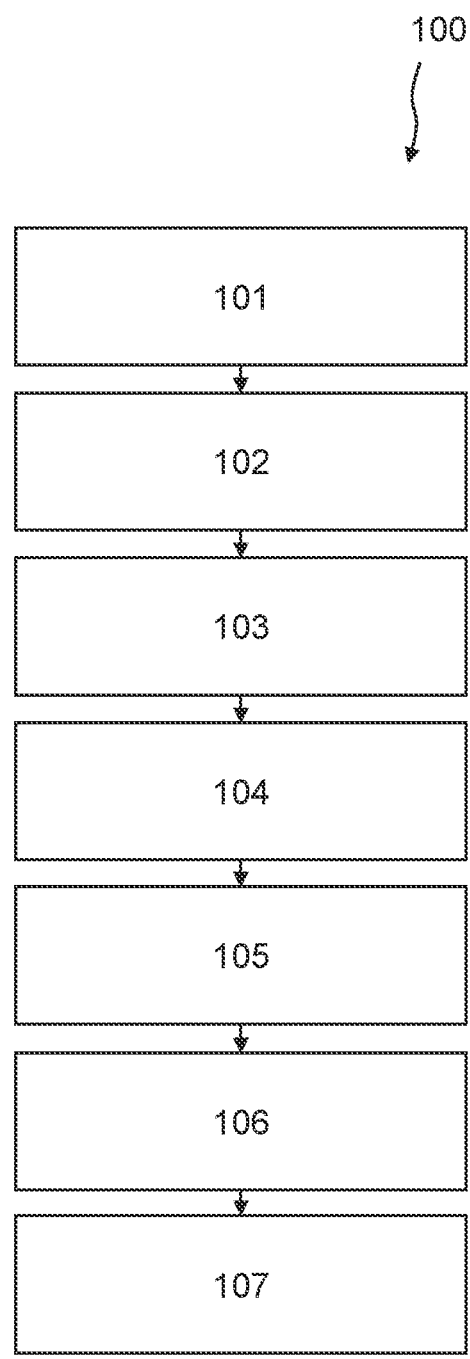
FIG. 9 is a schematic representation of an embodiment of the method.

FIG. 9 shows a schematic representation of an embodiment of the method 100 for controlling an illumination device, preferably an illumination device. In step 101, electrical energy in the form of a signal with an assigned frequency is applied to a supply line for energy transmission and signal transmission, which has exactly two electrical wires. In step 101, the frequency of the received signal is read out by a logic module arranged on the supply line and electrically connected to the supply line. In step 102, the frequency of the received signal is compared with data stored in the logic module. In step 103, a first light source is controlled, wherein, depending on the comparison between the frequency of the signal and the data stored in the logic module, an electrical supply to the first light source is enabled so that the first light source is supplied with the electrical energy and emits light, or is blocked so that the first light source is not supplied with the electrical energy and does not emit light. In step 104, a second light source is controlled, with an electrical supply to the second light source being enabled as a function of the comparison between the frequency of the signal and the data stored in the logic module, so that the second light source is supplied with the electrical energy and emits light, or is blocked, so that the second light source is not supplied with the electrical energy and does not emit light. In step 105, control of possibly further light sources takes place, with an electrical supply to the possibly further light sources being enabled as a function of the comparison between the frequency of the signal and the data stored in the logic module, so that the possibly further light sources have the electrical energy applied to them and emit light, or being blocked, so that the possibly further light sources do not have the electrical energy applied to them and do not emit light. In step 106, an illumination intensity of the light sources is controlled, the electrical energy being assigned a duty cycle and/or a pulse duration, in particular, as a function of a defined desired illumination intensity, and the duty cycle and/or the pulse duration of the signal of the electrical energy being controlled, so that the energy supply of the light sources, to which the electrical supply is enabled by the logic module, is effected with the electrical energy with the assigned duty cycle and/or the assigned pulse duration.

The invention claimed is:

1. A lighting device for lighting an animal husbandry device, comprising:
   a light source arrangement with a first light source and a second light source, wherein the first light source and the second light source are designed to emit light with wavelengths differing from one another or colors differing from one another;
   a luminaire comprising the light source arrangement and a logic module which is signal-connected to the light source arrangement, wherein the logic module is configured:
      to receive an electrical power supply signal via an electrical power supply line;
      to read a frequency of a signal from the electrical power supply signal, and compare the frequency of the signal with data stored in the logic module; and
      in dependence on the comparison between the frequency of the signal and the data stored in the logic module, to determine a channel coded in the frequency or a plurality of channels coded in the frequency,
      in dependence on the channel or channels coded in the frequency, to enable electrical power to the first light source such that the first light source is supplied with the electrical power from the electrical power signal and emits light, or to block electrical power to the first light source such that the first light source is not supplied with the electrical power signal from the electrical power supply line and does not emit light, and
      depending on the channel or channels coded in the frequency, to enable an electrical supply to the second light source, such that the second light source is supplied with an electrical energy from the electrical power supply signal and emits light, or to block, such that the second light is not supplied with the electrical energy from the electrical power supply signal and does not emit light.

2. The lighting device according to claim 1, wherein the colors differing from each other are red and white.

3. The lighting device according claim 1, further comprising:
   a control device comprising a light determination unit comprising a user interface for determining the channel or channels to be encoded in the frequency, the color to be encoded in the frequency, or for determining a target illuminance, and which is adapted to:
   modulate the frequency of the electrical power supply signal as a function of the channel or channels to be coded in the frequency or the color or colors to be encoded in the frequency; or
   modulate a duty cycle or a pulse duration of the power supply signal depending on the defined target illuminance, and to control the duty cycle or the pulse duration of the power supply signal, such that the power supply of the light sources for which the electrical supply is enabled by the logic module is provided with the electrical energy with the assigned duty cycle or the assigned pulse duration from the power supply signal.

4. The lighting device according to claim 1, wherein the logic module is adapted to control the first and second light sources and one or more optionally further light sources such that the first light source is supplied with a first portion of the electrical energy from the power supply signal and the second light source is supplied with a second portion, different from the first portion, of the electrical energy from the power supply signal and each of the optionally further light sources is supplied with a corresponding further portion of the electrical energy from the power supply signal; and control the electrical energy supplied to the first and the second and, if applicable, the further optional light sources in such a way that a first radiation intensity of the first light source and a second intensity, different from the first intensity, of the second light source and, optionally radiation intensities of the further optional light sources are generated, whose mixture causes a radiation with the color coded in the frequency.

5. The lighting device according to claim 1, wherein the logic module is adapted to:
in dependence of the channel coded in the frequency or of the plurality of channels coded in the frequency to enable an electrical supply to one or more optional further light sources, so that the optional further light sources are supplied with the electrical energy or a portion of the electrical energy and emit light, or to block said electrical supply such that the optionally further light sources are not supplied with the electrical energy and do not emit any light.

6. The lighting device according to claim 1, further comprising:
a supply line for conducting the electrical power supply signal with exactly two electrical lines, whereby the logic module, and the first light source and the second light source are arranged on the supply line and are electrically connected to the supply line; or
a reverse polarity protection in the form of a rectifier, which is electrically connected to the logic module and which passes the electrical power supply signal to the logic module with a predetermined polarity.

7. The lighting device according to claim 1, wherein the luminaire comprises a contacting component designed to penetrate an insulating sheath of a supply line and are electrically connected by means of this contacting component to a supply line having exactly two electrical lines.

8. The lighting device according to claim 1, wherein the power supply signal is a pulse width modulated signal and the pulse width modulated signal has a duty cycle and a frequency;
wherein the electrical voltage of the power supply signal changes with the frequency of the signal between a first voltage value, at 100% of the electrical voltage, and a second voltage value, between 0% or 400% of the electrical voltage; or
wherein the electric current of the power supply signal changes with the frequency of the signal between a first current value, at 100% of the electric current, and a second current value, between 0% or −100% of the electric current.

9. The lighting device according to claim 3, wherein the control device is adapted:
to assign a duty cycle to the power supply signal as a function of the target illuminance, so that the electrical power supply to the light sources takes place in the form of a signal with the assigned duty cycle;
to assign a pulse duration to the power supply signal as a function of the target illuminance, so that the electrical power supply of the light sources with electrical energy takes place in the form of a signal with the assigned pulse duration; or
to assign a period duration to the power supply signal as a function of a target illuminance, so that the electrical supply of the light sources with electrical energy takes place with electrical energy in the form of a signal with the assigned period duration.

10. The lighting device according to claim 9, wherein:
a frequency is assigned to the power supply signal as a function of a color value or a time value, so that the supply of the light sources with the power supply signal is controlled as a function of the color value or the time value, wherein the supply of electrical energy takes place with portions of the power supply signal or is completely enabled or blocked.

11. The lighting device according to claim 1, wherein:
the assigned frequencies are at least 300 Hz or the assigned frequencies are at most 2500 Hz.

12. The lighting device according to claim 3, wherein:
the control device is signal-connected to a driver and the driver is connected to a supply line with exactly two electrical lines, the driver applying the power supply signal to the supply line, wherein the power supply signal has a nominal output voltage of not more than 48 V.

13. The lighting device according to claim 1, wherein at least one of the light sources is designed as a light emitting diode and wherein the light source arrangement comprises at least two light emitting diodes with different colors, wherein the colors are selected from the following group: red, green, blue, white, or ultraviolet.

14. The lighting device according to claim 6, wherein the lighting device or the supply line has a length of at least 1 m.

15. The lighting device according to claim 3, wherein the control device is adapted to control the application of electrical energy to a supply line such that the application of electrical energy to the supply line in the form of a pulse-width modulated signal comprises a time-varying pulse-width modulated signal and the signal proceeds according to a repetitive pattern having a duration of 24 hours.

16. A control unit for controlling a lighting device according to claim 1, wherein:
the control unit comprises a connection unit for a supply line and is adapted:
to apply an energy supply signal to the connection unit; and
to modulate at least two alternative different frequencies, two alternative different duty cycles, or two alternative different pulse durations onto the energy supply signal, so that the application of the energy supply signal to the supply line takes place in the form of at least one of at least two different energy supply signals;
wherein the application of the power supply signal to the supply line takes place with a predetermined time-controlled scheme having a duration of 24 hours.

17. A method for controlling a lighting device according to claim 1, comprising the steps of:
applying a power supply signal in the form of a signal having an assigned frequency to a supply line for power transmission and signal transmission;
reading out the frequency of the received power supply signal by means of a logic module arranged in the luminaire, which logic module is arranged on the supply line and is electrically connected to the supply line;

comparing the frequency of the received power supply signal with data stored in the logic module;

controlling the first light source arranged in the luminaire, wherein, as a function of the comparison between the frequency of the power supply signal and the data stored in the logic module, an electrical supply to the first light source is enabled so that the first light source is supplied with the electrical energy or is blocked so that the first light source is completely, partially, or not supplied with the power supply signal and thereby emits light or does not emit any light; and controlling the second light source arranged in the luminaire, wherein, as a function of the comparison between the frequency of the power supply signal and the data stored in the logic module, an electrical supply to the second light source is enabled so that the second light source is supplied with the electrical energy or is blocked so that the second light source is completely, partially, or not supplied with the power supply signal and thereby emits light or does not emit light.

18. The method for controlling a lighting device according to claim 17, comprising the additional step of:

controlling at least one further light source arranged in the luminaire, whereby in dependence on the comparison between the frequency of the power supply signal and the data stored in the logic module, an electrical supply to the further light source is enabled, so that the further light source is supplied with the electrical energy, or is blocked, so that the further light source is completely, partially, or not at all supplied with the signal and thereby emits light or does not emit any light.

19. A lighting device for lighting an animal husbandry device, comprising:

a luminaire comprising a light source arrangement and a logic module which is signal-connected to the light source arrangement, wherein the light source arrangement further comprises a first light source and a second light source the first light source and the second light source emitting light with wavelengths differing from one another or colors differing from one another;

wherein the logic module:
receives an electrical power supply signal via an electrical power supply line,
reads a frequency of a signal from the electrical power supply signal, and
compares the frequency of the signal with data stored in the logic module, and wherein the logic module in dependence on the comparison between the frequency of the signal and the data stored in the logic module determines a channel coded in the frequency or a plurality of channels coded in the frequency, and depending on the channel or channels coded in the frequency, enables electrical power to the first light source, such that the first light source is supplied with the electrical power from the electrical power supply line and emits light, or to block electrical power to the first light source such that the first light source is not supplied with the electrical power from the power supply signal and does not emit light, and depending on the channel or channels coded in the frequency, enables electrical power to the second light source, such that the second light source is supplied with an electrical energy from the electrical power supply line and emits light, or to block, such that the second light is not supplied with the electrical energy from the electrical power supply line and does not emit light.

20. A method for controlling a lighting device for lighting an animal husbandry device comprising a luminaire having a light source arrangement and a logic module which is signal-connected to the light source arrangement, wherein the light source arrangement further comprises a first light source and a second light source, the first light source and the second light source emitting light with wavelengths differing from one another or colors differing from one another, the method comprising the steps of:

applying a power supply signal in the form of a signal having an assigned frequency to a supply line for power transmission and signal transmission;

reading out the frequency of the received power supply signal by means of a logic module arranged in the luminaire, which logic module is arranged on the supply line and is electrically connected to the supply line;

comparing the frequency of the received power supply signal with data stored in the logic module;

controlling the first light source arranged in the luminaire, wherein, as a function of the comparison between the frequency of the power supply signal and the data stored in the logic module, an electrical supply to the first light source is enabled so that the first light source is supplied with the electrical energy or is blocked so that the first light source is completely, partially, or not supplied with the power supply signal and thereby emits light or does not emit any light; and controlling the second light source arranged in the luminaire, wherein, as a function of the comparison between the frequency of the power supply signal and the data stored in the logic module, an electrical supply to the second light source is enabled so that the second light source is supplied with the electrical energy or is blocked so that the second light source is completely, partially, or not supplied with the power supply signal and thereby emits light or does not emit light.

* * * * *

UNITED STATES PATENT AND TRADEMARK OFFICE
CERTIFICATE OF CORRECTION

PATENT NO. : 11,477,865 B2
APPLICATION NO. : 17/370122
DATED : October 18, 2022
INVENTOR(S) : Neugebauer Page 1 of 1

It is certified that error appears in the above-identified patent and that said Letters Patent is hereby corrected as shown below:

In the Claims

Column 17, Claim 8, Line 53, "400%" should be -- -100%--.

Column 19, Claim 19, Line 38, "light source" should be --light source,--.

Signed and Sealed this
Twenty-third Day of May, 2023

Katherine Kelly Vidal
*Director of the United States Patent and Trademark Office*